United States Patent [19]

Sato

[11] Patent Number: 5,530,589
[45] Date of Patent: Jun. 25, 1996

[54] ZOOM LENS HAVING ANTI-VIBRATION OPTICAL SYSTEM

[75] Inventor: Susumu Sato, Chiba, Japan

[73] Assignee: Nikon Corporation, Tokyo, Japan

[21] Appl. No.: 315,679

[22] Filed: Sep. 30, 1994

Related U.S. Application Data

[63] Continuation of Ser. No. 170,983, Dec. 21, 1993, abandoned, which is a continuation of Ser. No. 820,924, Jan. 15, 1992, abandoned.

[30] Foreign Application Priority Data

Jan. 23, 1991 [JP] Japan .................................. 3-006133
Oct. 31, 1991 [JP] Japan .................................. 3-286183

[51] Int. Cl.$^6$ ............................ G02B 27/64; G02B 15/14
[52] U.S. Cl. ............................ 359/557; 359/684; 359/692
[58] Field of Search ................................. 359/557, 684, 359/692, 748, 791, 795

[56] References Cited

U.S. PATENT DOCUMENTS

| | | | |
|---|---|---|---|
| 4,818,081 | 4/1989 | Ito ........................................... | 359/692 |
| 5,000,549 | 3/1991 | Yamazaki ................................ | 359/557 |
| 5,000,551 | 3/1991 | Shibayama .............................. | 359/708 |
| 5,040,881 | 8/1991 | Tsuji ........................................ | 359/557 |
| 5,082,360 | 1/1992 | Sato et al. ............................... | 359/692 |

FOREIGN PATENT DOCUMENTS

| | | |
|---|---|---|
| 1-189621 | 7/1989 | Japan . |
| 1-191112 | 8/1989 | Japan . |
| 1-191113 | 8/1989 | Japan . |

*Primary Examiner*—Scott J. Sugarman
*Assistant Examiner*—Dawn-Marie Bey
*Attorney, Agent, or Firm*—Shapiro and Shapiro

[57] ABSTRACT

A zoom lens has a first group of a positive refractive power and a second group of a negative refractive power in sequence as seen from an object. The first group of the positive refractive power comprises a front group of a positive refractive power arranged to face the object and in front of an aperture iris and a rear group of a positive refractive power arranged between the aperture iris and an image plane. The rear group includes displacement means to drive it across an optical axis for vibration correction.

13 Claims, 1 Drawing Sheet

ZOOM LENS HAVING ANTI-VIBRATION OPTICAL SYSTEM

This is a continuation of application Ser. No. 08/170,983 filed Dec. 21, 1993 (now abandoned), which is a continuation of application Ser. No. 07/820,924 filed Jan. 15, 1992, (abandoned).

BACKGROUND OF THE INVENTION

1. Field of the Invention

The present invention relates to an anti-vibration optical system of a zoom lens for a compact camera.

2. Related Background Art

In the prior art system, any group of lenses of a zoom lens comprising two or more groups of lenses is displaced across an optical axis for correction (Japanese Laid-Open Patent Applications 1-189621, 1-191112 and 1-191113) or the correction is made by a portion of lenses in a first group G10 fixed in zooming (U.S. Pat. No. 5,040,881).

SUMMARY OF THE INVENTION

However, the prior art system not only causes the increase of a volume of an overall photographing optical system but also causes the increase of a volume of the anti-vibration optical system and it is not appropriate to be built in a compact lens shutter camera.

It is, therefore, an object of the present invention to provide a zoom lens having a compact photographing optical system and small effective diameter and length of an anti-vibration optical system compared to those of the photographing optical system.

In order to solve the above problems, the present invention provides a zoom lens having a first group $G_{10}$ of a positive refractive power and a second group $G_{20}$ of a negative refractive power in sequence as seen from an object, in which the first group $G_{10}$ of the positive refractive power comprises a front group G11 of a positive refractive power arranged to face the object and in front of an aperture iris $S_1$ and a rear group $G_{12}$ of a positive refractive power arranged between the aperture iris $S_1$ and an image plane. The rear group $G_{12}$ includes displacement means to drive it across an optical axis. The second group $G_{20}$ is movable along the optical axis for focusing, and it meets $$0.2 < f_{11}/f_{12} \quad (1)$$

$$0.7 < f_{10}/|f_{20}| < 1.5 \quad (2)$$

where $f_{11}$ is a focal distance of the front group $G_{11}$, $f_{12}$ is a focal distance of the rear group $G_{12}$, $f_{10}$ is an overall focal distance of the first group $G_{10}$ and $f_{20}$ is an overall focal distance of the second group $G_{20}$.

The rear group $G_{12}$ also meets $$r_1 \leq 0 \quad (3)$$

$$r_2 < 0 \quad (4)$$

$$r_3 < 0 \quad (5)$$

where $r_1$ is a radius of curvature of a first surface of the rear group $G_{12}$ closest to the object, $r_2$ is a radius of curvature of a second surface of the rear group $G_{12}$, and $r_3$ is a radius of curvature of a third surface of the rear group $G_{12}$.

A stationary iris $S_2$ fixed vertically to the optical axis is arranged immediately behind the rear group $G_{12}$.

The zoom lens of the present invention basically comprises two positive and negative groups in order to attain an optical system which can be built in a compact camera.

The zoom lens for the compact camera of this type is usually of large volume because the number of lenses of the first group $G_{10}$ is large and a length of the first group $G_{10}$ along the optical axis is long. Thus, where the entire first group $G_{10}$ is a correcting optical system displaceable to the optical axis, a holding mechanism and a driving mechanism for the vibration correction are of large volume. When a zooming mechanism is additionally included, it is more difficult to build in the anti-vibration optical system in the compact camera.

Accordingly, it is not preferable to assemble the entire first group $G_{10}$ to the anti-vibration optical system.

Further, the zoom lens for the compact camera of this type generally has a very large effective diameter of the second group $G_{20}$ and it is in a body of the compact camera. Where the hold mechanism and the drive mechanism are added to such a large diameter outer periphery, the camera body becomes of large volume and a compact camera is not provided. Accordingly, it is not preferable to assemble the entire second group $G_{20}$ to the anti-vibration optical system.

Where the entire photographing optical system is assembled to the anti-vibration optical system, the mechanisms are of larger volume than when individual groups are so assembled.

In the present invention, as shown in FIG. 1, the first group $G_{10}$ comprises the front group $G_{11}$ and the rear group $G_{12}$ which is the anti-vibration optical system, and the aperture iris $S_1$ is arranged between the front group $G_{11}$ and the rear group $G_{12}$. Preferably, the front group $G_{11}$ has a positive refractive power.

The aperture iris is required to uniformly stop a light beam of a small image angle to a large image angle and hence the light beam is of very high density throughout the image angle. Accordingly, the effective diameter is relatively small and effective diameters of the lenses immediately in front of and behind the aperture iris are also small.

The same is true for the optical system of the present invention. The effective diameter is small on a surface of the front group $G_{11}$ which faces the image and on a surface of the rear group $G_{12}$ which is closest to the object. The effective diameter of the front group $G_{11}$ is large because the light beam of a large image angle is applied to the surface closest to the object. The rear group $G_{12}$ receives the light beam from the front group $G_{11}$ and applies it to the second group $G_{20}$ having a dispersion function. Thus, it has a smallest effective diameter among the front group $G_{11}$ and the rear group $G_{12}$ of the first group $G_{10}$ and the lens group of the second group $G_{20}$.

Accordingly, the rear group $G_{12}$ of the first group $G_{10}$ is most appropriate for the anti-vibration correcting optical system.

In order to further reduce the effective diameter, the front group $G_{11}$ is imparted with a positive refractive power rather than a negative refractive power so that the light beam applied to the rear group $G_{12}$ is converged and the effective diameter of the rear group $G_{12}$ is reduced. In order to effectively correct an aberration, it is preferable that the rear group $G_{12}$ has a positive refractive power and the positive refractive power of the front group $G_{11}$ is relatively small.

In order to simplify the anti-vibration drive mechanism, it is preferable that the rear group $G_{12}$ which is the anti-vibration optical system is movable perpendicularly to the optical axis, and the focusing is conducted by moving the second group $G_{20}$ which is resistive to an external shock.

In order to attain better aberration correction, it is preferable to meet $$0.2 < f_{11}/f_{12} \quad (1)$$

$$0.7 < f_{10}/|f_{20}| < 1.5 \quad (2)$$

where $f_{11}$ is a focal distance of the front group $G_{11}$ of the first group $G_{10}$, $f_{12}$ is a focal distance of the rear group $G_{12}$ and $f_{10}$ is a focal distance of the entire first group $G_{10}$.

The condition formulas are discussed below.

If a lower limit of the condition formula (1) is exceeded, a displacement for the vibration correction of the rear group $G_{12}$ of the first group $G_{10}$ which is the anti-vibration optical system increases, and it is difficult to correct the spherical aberration where the rear group $G_{12}$ of the first group $G_{10}$ comprises a small number of lenses as it does in the present invention. Even if the number of lenses of the rear group $G_{12}$ increases and the spherical aberration is well corrected, the lens body tube is of large volume because the number of lenses increases.

When the upper limit of the condition formula (2) is exceeded, a Petzval sum materially changes in a negative direction. When the lower limit is exceeded, a sufficient back focus is not assured and the effective diameter of the second group $G_{20}$ increases. Further, a ghost image is apt to appear on a film plane.

Further, it is preferable to meet $$r_1 \leq 0 \quad (3)$$

$$r_2 < 0 \quad (4)$$

$$r_3 < 0 \quad (5)$$

where $r_1$, $r_2$, and $r_3$ are radii of curvature of first, second and third surfaces of the rear group $G_{12}$ as viewed from the object.

The rear group $G_{12}$ which is the anti-vibration optical system should eliminate the dependency between the lens group fixed relative to the optical axis and the aberration, and it is preferable to correct the aberration by itself.

An astigmatism is particularly taken into consideration. In order to reduce the astigmatism of the rear group $G_{12}$ which is the anti-vibration optical system with a small number of lenses, each lens surface is constructed to have a center of curvature in a direction to the center of the iris $S_1$.

In the present invention, the aperture iris $S_1$ is arranged immediately in front of the rear group $G_{12}$ which is the anti-vibration optical system, and it is preferable that the radii of curvature $r_1$, $r_2$ and $r_3$ of the surfaces of the rear group $G_{12}$ as sequentially viewed from the object are negative as shown in the condition formulas (3), (4) and (5). The first surface may be planar.

It is preferable to arrange a fixed iris $S_2$ immediately behind the rear group $G_{12}$ which is the anti-vibration optical system. The rear group $G_{12}$ which is the anti-vibration correcting optical system should have the effective lens diameter which is large enough to permit the shift for correction. As a result, the light beam of the flare component is applied to the image plane through the expanded area. Accordingly, it is preferable to provide the fixed iris $S_2$ in order to shield the light beam of the flare component.

In accordance with the present invention, a more compact anti-vibration optical system which has small effective diameter and total length compared to those of the entire photographing optical system is attained, and the zoom lens having the anti-vibration optical system which can be built in the compact lens shutter camera is provided.

DETAILED DESCRIPTION OF THE PREFERRED EMBODIMENTS

Figure 1:
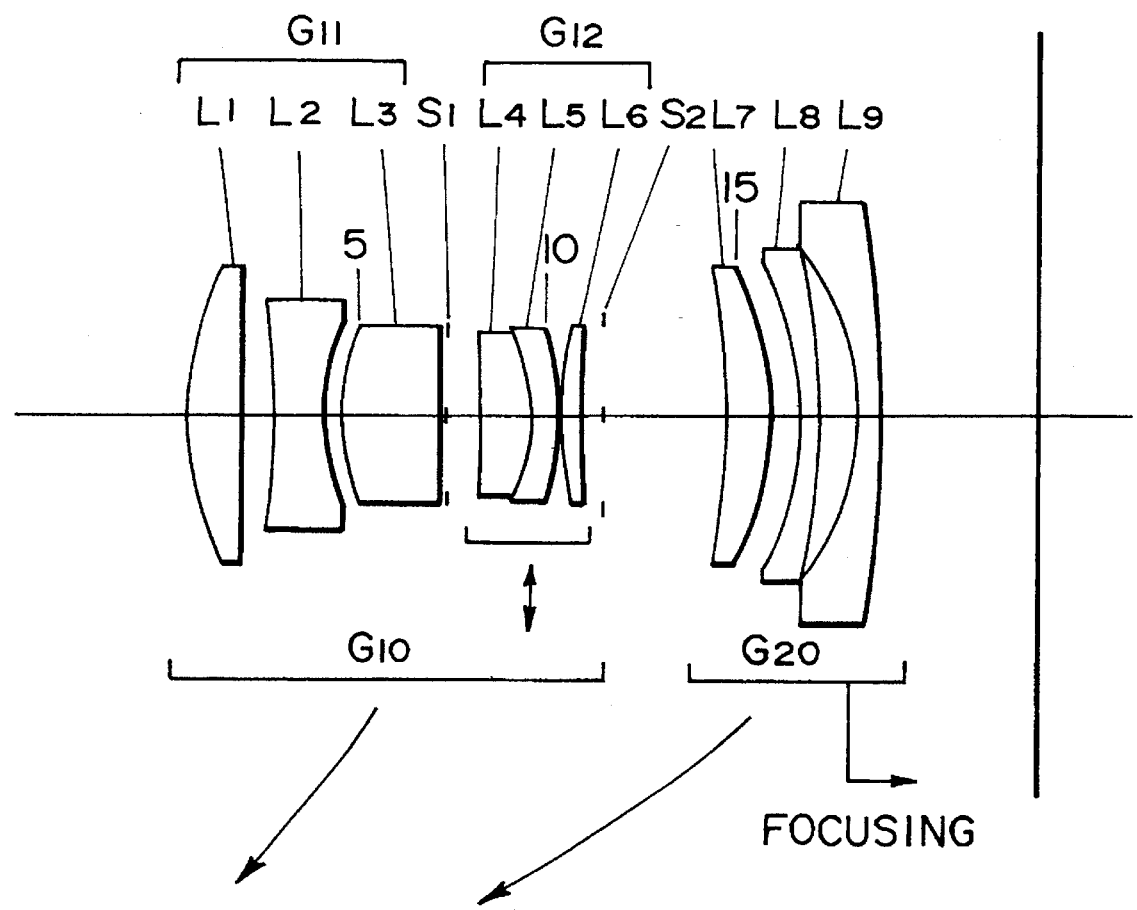
FIG. 1 shows a configuration of lenses in one embodiment of the present invention.

A basic configuration of the present invention comprises two groups of positive and negative zoom lenses.

A first group $G_{10}$ of a positive refractive power comprises a front group $G_{11}$ of a positive refractive power, an aperture iris $S_1$, a rear group $G_{12}$ of a positive refractive power, and a fixed iris $S_2$, in the sequence as viewed from an object. The front group $G_{11}$ comprises a positive meniscus lens $L_1$ having a convex plane facing the object, a double side concave lens $L_2$ and a positive meniscus lens $L_3$ having a convex plane facing the object, in the sequence as viewed from the object. The rear group $G_{12}$ comprises a cemented lens of a positive meniscus lens $L_4$ having a concave surface facing the object and a negative meniscus lens $L_5$ having a concave surface facing the object, and a positive meniscus lens $L_6$ having a convex surface facing the object, in the sequence as viewed from the object. The second group $G_{20}$ comprises a positive meniscus lens $L_7$ having a concave surface facing the object, a negative meniscus lens $L_8$ having a concave surface facing the object, and a negative meniscus lens $L_9$ having a concave surface facing the object, in the sequence as viewed from the object.

The vibration correction is conducted by moving the rear group $G_{12}$ perpendicularly to the optical axis. In the present embodiment, the positive meniscus lens $L_4$ of the rear group $G_{12}$ having the concave surface facing the object and the negative meniscus lens $L_5$ having the concave surface facing the object are cemented in order to enforce the eccentricity by the anti-vibration of the anti-vibration actuator.

The focusing is effected by moving the second group $G_{20}$ in the direction of optical axis.

Data of the present embodiment are shown in Table 1. Left side numerals in the table show the sequence of the lenses as viewed from the object, r is a radius of curvature of a lens surface d is a lens thickness and a lens surface to surface distance, v is an Abbe number and n is a refraction index for d-line ($\lambda$=587.6 nm).

|    | r                    | d       | v    | n       |
|----|----------------------|---------|------|---------|
| 1  | 18.260               | 3.30    | 58.5 | 1.65160 |
| 2  | 800.000              | 1.82    |      |         |
| 3  | −42.088              | 3.00    | 45.4 | 1.79668 |
| 4  | 12.222               | 0.98    |      |         |
| 5  | 13.710               | 5.90    | 46.5 | 1.58267 |
| 6  | 2216.284             | 0.30    |      |         |
| 7  | aperture iris        | 2.00    |      |         |
| 8  | −65.000              | 3.00    | 57.0 | 1.62280 |
| 9  | −9.896               | 1.70    | 23.0 | 1.86074 |
| 10 | −15.299              | 0.10    |      |         |
| 11 | 23.067               | 1.28    | 32.2 | 1.67270 |
| 12 | 62.243               | 1.20    |      |         |
| 13 | fixed iris (variable)|         |      |         |
| 14 | −36.920              | 2.70    | 28.6 | 1.79504 |
| 15 | −17.224              | 1.70    |      |         |
| 16 | −17.886              | 1.20    | 33.9 | 1.80384 |
| 17 | −36.726              | 2.30    |      |         |
| 18 | −14.311              | 1.30    | 45.4 | 1.79668 |
| 19 | −77.530              | BF      |      |         |
| f  | 36.0910              | 55.1669 |      |         |
| DO | ∞                    | ∞       |      |         |

-continued

|  | r | d | v | n |
|---|---|---|---|---|
| d13 | 7.4882 | 1.5392 |  |  |
| BF | 9.4425 | 27.6902 |  |  |

$f_{10} = +25.48$
$f_{11} = +1115.34$
$f_{12} = +22.411$
$f_{20} = -24.37$ (Amount of vibration correction)
Displacement of rear group $G_{12}$
perpendicular to optical axis     +0.10 mm—-0.10 mm
Displacement of image   $f = 36.1$   +0.14 mm—-0.14 mm
                        $f = 55.2$   +0.21 mm—-0.21 mm (Values for conditions)
$f_{11}/f_{12} = 49.77$
$f_{10}/|f_{20}| = 1.05$

What is claimed is:

1. A zoom lens comprising, in order from an object side:

a first lens group of a positive refractive power;

a second lens group of a negative refractive power;

said first lens group of the positive refractive power including, in order from the object side, a front lens group of a positive refractive power and having at least one positive lens and at least one negative lens, a rear lens group and an aperture iris between said front lens group and the rear lens group; and said rear lens group being displaceable across an optical axis of said zoom lens to correct for vibration of said zoom lens;

wherein $$0.2 < f_{11}/f_{12} \tag{1}$$

$$0.7 < f_{10}/|f_{20}| < 1.5 \tag{2}$$

where $f_{11}$ is a focal length of said front group, $f_{12}$ is a focal length of said rear group displaceable across the optical axis, $f_{10}$ is a focal length of the entire first group and $f_{20}$ is a focal length of said second group.

2. A zoom lens according to claim 1 wherein said rear group has a positive refractive power.

3. A zoom lens according to claim 1 wherein said second group is movable along said optical axis for focusing.

4. A zoom lens according to claim 1 wherein said rear group meets $$r1 \leq 0 \tag{3}$$

$$r_2 < 0 \tag{4}$$

$$r_3 < 0 \tag{5}$$

where $r_1$ is a radius of curvature of a first surface of the rear group, $r_2$ is a radius of curvature of a second surface thereof, and $r_3$ is a radius of curvature of a third surface thereof, as viewed from an object.

5. A zoom lens according to claim 2 wherein said rear group meets $$r_1 \leq 0 \tag{3}$$

$$r_2 < 0 \tag{4}$$

$$r_3 < 0 \tag{5}$$

where $r_1$ is a radius of curvature of a first surface of the rear group, $r_2$ is a radius of curvature of a second surface thereof, and $r_3$ is a radius of curvature of a third surface thereof, as viewed from an object.

6. A zoom lens according to claim 3 wherein said rear group meets $$r_1 \leq 0 \tag{3}$$

$$r_2 < 0 \tag{4}$$

$$r_3 < 0 \tag{5}$$

where $r_1$ is a radius of curvature of a first surface of the rear group, $r_2$ is a radius of curvature of a second surface thereof, and $r_3$ is a radius of curvature of a third surface thereof, as viewed from an object.

7. A zoom lens according to claim 1 wherein a fixed iris fixed perpendicularly to the optical axis is arranged immediately behind said rear group.

8. A zoom lens according to claim 2 wherein a fixed iris fixed perpendicularly to the optical axis is arranged immediately behind said rear group.

9. A zoom lens according to claim 3 wherein a fixed iris fixed perpendicularly to the optical axis is arranged immediately behind said rear group.

10. A zoom lens according to claim 4 wherein a fixed iris fixed perpendicularly to the optical axis is arranged immediately behind said rear group.

11. A zoom lens according to claim 5 wherein a fixed iris fixed perpendicularly to the optical axis is arranged immediately behind said rear group.

12. A zoom lens according to claim 6 wherein a fixed iris fixed perpendicularly to the optical axis is arranged immediately behind said rear group.

13. An optical system comprising at least two lens groups movable in a direction of an optical axis thereof;

at least one of said lens groups having a vibration correction lens group which moves in a direction perpendicular to said optical axis to correct vibration of a photographing image; and a fixed iris fixed in a direction perpendicular to said optical axis and positioned near said vibration correction lens group;

wherein said vibration correction lens group is arranged between said fixed iris and an aperture diaphragm.

* * * * *